United States Patent Office 2,875,129
Patented Feb. 24, 1959

2,875,129

PROPHYLACTIC CALCIUM CHELATE COMPOSITIONS FOR HEAVY METAL POISONING

Frederick C. Bersworth, Framingham Center, Mass., and Martin Rubin, Silver Spring, Md., assignors, by direct and mesne assignments, to The Dow Chemical Company, Midland, Mich., a corporation of Delaware No Drawing. Application November 3, 1954
Serial No. 466,664

10 Claims. (Cl. 167—55)

This invention is concerned with metal detoxification and particularly with food products and prophylactic compositions which can be fed to living organisms to re-relieve them of the symptoms of metal intoxication.

It is a common observation among owners of pets that they are subject to developing lead poisoning. Dogs and cats, particularly those which live in the normal civilized surroundings of human beings, often express themselves by chewing on objects with the result that they take in a certain amount of paint pigment. The resultant lead poisoning, or other heavy metal poisoning, becomes progressively worse and may utilmately cause serious difficulty or death of the animals involved.

Farm animals, though subjected to fewer hazards of civilization, nevertheless encounter problems involving lead and other heavy metals when they range through pastures bordering orchards which have been sprayed with lead insecticide. Here again the quantity of lead insecticide which reaches the forage may be extremely small, but because it is cumulative it can cause serious difficulty over an extended period of time.

Humans working in circumstances where they are exposed to lead or lead fumes may also develop a progressive ingestion of lead. Although industrial hygiene practices in modern establishments are such that the danger is reduced to a minimum, nevertheless the hazard exists and workers in lead tetra ethyl establishments who may merely handle a quantity of the material periodically, can receive accidental dosages. The hazards which exist in lead mines, lead smelting operations, lead pigment operations and lead storage battery manufacture are numerous and not always completely eliminated by safe industrial practices.

It is accordingly a basic object of this invention to provide a prophylactic means by which these industrial and farm hazards may be minimized or avoided.

It is another object of the invention to provide food products and prophylactic compositions useful in combating exposures to lead which have been described.

Other objects and advantages will in part be obvious and in part appear hereinafter.

We have discovered that the calcium chelates of certain synthetic non-metabolizable polyamino poly carboxylic acid compounds are not only tolerated by living organisms in relatively large amounts, but these compounds react essentially as base exchange materials with a large number of heavy metal ions in the living organism to convert them into soluble metallic complexes with liberation of non-toxic calcium in the system. Accordingly, when the calcium complex is introduced into the digestive stream of the animal, for example, its properties are such that calcium is rather weakly chelated at the substantially neutral or slightly acid pH values encountered in the stomach and, in its passage through the digestive system, calcium is readily exchanged for such heavy metal as may be encountered.

Accordingly, the invention consists in the blending of certain of these calcium chelates with the food products and other materials which are fed to the living organism in which a prophylactic treatment for metal intoxication is to be applied.

The calcium chelates of compounds corresponding to the following generic formulation are useful for purposes of the invention:

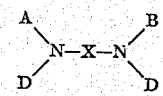

wherein A and B are selected from the group consisting of —CH$_2$COOM, —CH$_2$CH$_2$COOM, —CH$_2$CH$_2$OH, —CH$_2$CH$_2$CH$_2$OH, —CH(CH$_3$)CH$_2$OH, wherein A and B may be alike or different; X is selected from the group consisting of bivalent alkylene radicals which place 2–3 carbon atoms between the nitrogens, such as

—CH$_2$CH$_2$—, —CH$_2$CH$_2$CH$_2$—

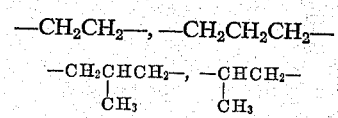

D is selected from the group consisting of —CH$_2$COOM, —CH$_2$CH$_2$COOM, and M is hydrogen or alkali metal, such as sodium, potassium or lithium.

Typical chelating agents corresponding to this definition are the following acids and their salts:

Ethylenediaminetetraacetic acid
Monohydroxyethylethylenediaminetriacetic acid
Dihydroxyethylethylenediaminediacetic acid and corresponding propionic acid compounds and propanol substituted compounds. The characteristic property of the agents is their capacity to form metal chelates of the following type:

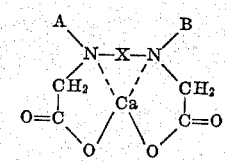

In accordance with this invention, calcium chelates of the type indicated may be incorporated into foods and tablets to be taken orally by humans and animals as a prophylactic measure to control heavy metal intoxication.

Where farm animals or pets or workers exposed to lead or heavy metal intoxication are to be given some protection against the hazard, we have found that the incorporation of a small proportion of the calcium chelate of one or more of the compounds described in the food is useful in bringing about a natural elimination of the heavy metal in soluble form and in this way the accumulation of the heavy metal in the organism is kept below a symptomatic toxic level. For example, in one experiment a group of rats was poisoned by administration of nickel salts. Treatment with a solution of the calcium complex of ethylenediaminetetra acetic acid in the drinking water, in the food and by injection, resulted in a prompt excretion of poisonous metal. The excretion of the toxic metal in this instance may be qualitatively and quantitatively recognized by the appearance of the deep blue color of the nickel chelate in the urine.

For oral administration it is possible to feed the dry calcium chelate to the living organism in the form of sapsules or pills. In the case of human beings, this of course is a relatively simple operation and may be done directly. However, where animals are concerned, oral use, though most convenient, cannot usually be accomplished by direct administration of pills and the material must be incorporated into the food.

In another experiment several groups of rats were poisoned by administration of nickel salts and lead salts. The calcium chelate of ethylenediaminetetraacetic acid was then incorporated into their food in a concentration of about 3% of the gross intake. Over a period of several days following a day's ingestion of food so treated, a substantial quantity of the poisonous metal was detected in the animals' excreta.

Where the control of lead intoxication is to be applied to workers in establishments handling lead compounds, the administration is best carried out by means of pills, capsules or salt tablets issued to the workers on a periodic basis. The exact quantity to be served for the prophylactic purpose of course will vary with the treatment and the degree of exposure, but generally if an excess of the material is administered no serious results will follow because it is merely eliminated from the body. Typical compositions, therefore, useful for administration of the calcium chelate to humans, are the following, wherein it is understood that any of the excipients mentioned, such as dextrose, starch, sugar, or the like, may be varied or interchanged in such proportions as may suit the needs of the case.

*Example 1*

| | Parts by weight |
|---|---|
| Sodium chloride | 50 |
| Starch | 25 |
| Calcium chelate of ethylenediaminetetraacetic acid, sodium salt | 5–25 |

Used as a salt tablet, for example, in plants where lead compounds are handled, the daily dosage given to any worker may be regulated by the number used. If it is desired to have the calcium chelate in all tablets, the proportion may be reduced to work out the needed dosage. The calcium chelate of any of the other agents mentioned may be used in formulating the pill or capsule.

For administering the calcium chelate to farm animals on a prophylactic basis, several techniques may be adopted. The first and most direct is to spray a solution of a calcium chelate on to the animals' fodder, or to mix it into any commercial meal which is to be used for feeding the animals. For example, with dairy cows, the daily pasturage may result in the ingestion of a small quantity of lead so that upon return of the animals to the barn for the night the fodder or the meal may include as much as 1 to 3% of the calcium chelate of the ethylenediaminetetraacetic acid or their compounds, based on the dry weight of the meal used. It has also been found convenient to incorporate the material into silage by dusting the compound lightly into the silage as it is made, or spraying a solution of it lightly into the silage.

For administration of the material to pets such as cats and dogs maintained in the home, the simplest procedure is to incorporate it into the daily canned rations used for such pets. For example, the dog requiring a daily pound of horse meat can have its daily quota of calcium chelate incorporated directly into the meat in an amount as high as 1 to 3% of the weight of the meat. Similar administration of the material to cats may be carried out.

A further convenient technique for supplying the metal detoxifying agent to animals, particularly pasture animals, is to incorporate it into their salt cakes. It is common practice among farmers to provide large cakes of salt placed in the animal pasture and as the animal feels a craving for salt it has access to it. By incorporating as much as 25–50% of the calcium chelate into the salt cake effective administration of the calcium chelate for prophylactic purposes is worked out because it seems that with the development of heavy metal intoxication in the beast there comes a thirst and a craving for salt. Accordingly, with such symptoms the animal is practically driven to self-medication. A typical composition useful for salt licks therefor, is the following:

*Example II.—Salt cake*

| | Parts |
|---|---|
| Sodium chloride (food grade) | 50 |
| Binder (e. g. starch and/or water) | 10–15 |
| Calcium chelate of ethylenediaminetetraacetic acid | 10–25 |

The mixture may be prepared and pressed into the usual 5–10 pound cakes which are placed in pastures. When it is desired to feed the animal traces of iron or other metals it may need in its metabolism, chelates of those metals may be incorporated into the mix in amounts up to 1–3 percent by weight. It is understood that the various chelating agents described are interchangeable in the compositions. Some advantage may be achieved through use of the mono-ethanol ethylenediaminetriacetic acid and the diethanol compound for they are effective over wide pH ranges.

This application is a continuation-in-part of our prior application, Serial No. 216,258, filed March 17, 1951, now abandoned.

What is claimed is:

1. A food product useful as a prophylactic material for preventing a toxic accumulation of heavy metal in a living organism, comprising the food product containing up to 3% of the calcium chelate of a compound corresponding to the following generic formula:

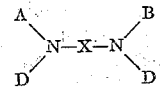

wherein A and B may be alike and are selected from the group consisting of —CH$_2$COOM, —CH$_2$CH$_2$COOM, —CH$_2$CH$_2$OH, —CH$_2$CH$_2$CH$_2$OH, —CH(CH$_3$)CH$_2$OH, X is selected from the group consisting of bivalent alkylene radicals which place 2–3 C atoms between the nitrogen, and D is selected from the group consisting of —CH$_2$COOM, —CH$_2$CH$_2$COOM; and M is selected from the group consisting of hydrogen and alkali metals.

2. A food product in accordance with claim 1 in which the basic food is animal silage.

3. A food product in accordance with claim 1 in which the basic food is grain meal.

4. A food product in accordance with claim 3 which contains about 1–3 percent by weight of the essentially neutral alkali metal salt of the calcium chelate of ethylenediaminetetraacetic acid.

5. A food product in accordance with claim 3 which contains about 1–3 percent by weight of the essentially neutral alkali metal salt of the calcium chelate of mono-ethanol ethylenediaminetriacetic acid.

6. A food product in accordance with claim 3 which contains about 1–3 percent by weight of the essentially neutral alkali metal salt of the calcium chelate of diethanol ethylenediaminediacetic acid.

7. A food supplement composition consisting essentially of sodium chloride, excipient and about 1–50 percent by weight of the calcium chelate of a compound corresponding to the following generic formula:

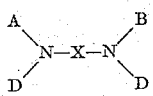

wherein A and B may be alike and are selected from the group consisting of —CH$_2$COOM, —CH$_2$CH$_2$COOM, —CH$_2$CH$_2$OH, —CH$_2$CH$_2$CH$_2$OH, —CH(CH$_3$)CH$_2$OH, X is selected from the group consisting of bivalent alkylene radicals which place 2–3 C atoms between the nitrogen, and D is selected from the group consisting of —CH$_2$COOM, —CH$_2$CH$_2$COOM; and M is selected from the group consisting of hydrogen and alkali metals.

8. A salt cake composition in accordance with claim 7 in which the calcium chelate of ethylenediaminetetraacetic acid is present in amount from about 5-50 percent of the mixture.

9. A composition in accordance with claim 7 in which the calcium chelate of monoethanol ethylenediaminetriacetic acid is present in amount from about 5-50 percent of the mixture and the whole is formed into a cake.

10. A composition in accordance with claim 7 in which the calcium chelate of diethanolethylenediaminediacetic acid is present in amount from about 5-50 percent of the mixture and the whole is formed into a cake.

References Cited in the file of this patent
UNITED STATES PATENTS

| | | |
|---|---|---|
| 1,229,317 | Owens | June 12, 1917 |
| 2,604,401 | Ely | July 22, 1952 |
| 2,698,823 | Bersworth | Jan. 4, 1955 |

OTHER REFERENCES

Kehoe: J. A. M. A., vol. 157, No. 4, January 22, 1955, pp. 341 and 342.

Versene-Technical Bull., No. 1, 1949, pp. 1, 2, 10 and 22.